United States Patent
Soeken et al.

(10) Patent No.: US 11,119,773 B1
(45) Date of Patent: Sep. 14, 2021

(54) RUNTIME QUANTUM-MEMORY MANAGEMENT

(71) Applicant: Microsoft Technology Licensing, LLC, Redmond, WA (US)

(72) Inventors: Mathias Soeken, Montreux (CH); Martin Henri Roetteler, Woodinville, WA (US); Krysta Marie Svore, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/844,948

(22) Filed: Apr. 9, 2020

(51) Int. Cl.
| | |
|---|---|
| *G06F 9/30* | (2018.01) |
| *G06F 15/82* | (2006.01) |
| *G06N 10/00* | (2019.01) |
| *G06F 16/901* | (2019.01) |

(52) U.S. Cl.
CPC .......... *G06F 9/30101* (2013.01); *G06F 15/82* (2013.01); *G06F 16/9027* (2019.01); *G06N 10/00* (2019.01)

(58) Field of Classification Search
None
See application file for complete search history.

(56) References Cited

U.S. PATENT DOCUMENTS

| | | | | |
|---|---|---|---|---|
| 2007/0239366 A1* | 10/2007 | Hilton | ..................... | B82Y 10/00 702/27 |
| 2009/0078931 A1* | 3/2009 | Berkley | .................. | G06N 10/00 257/31 |
| 2010/0094796 A1* | 4/2010 | Roetteler | ............... | B82Y 10/00 706/52 |

(Continued)

FOREIGN PATENT DOCUMENTS

WO 2016200747 A1 12/2016

OTHER PUBLICATIONS

Lanyon, B.P., et al., Measurement-Based Computation with Trapped Ions, 2013, American Physical Society, Physical Review Letters, 5 pages. (Year: 2013).*

(Continued)

*Primary Examiner* — Eric Coleman
(74) *Attorney, Agent, or Firm* — Alleman Hall Creasman & Tuttle LLP

(57) ABSTRACT

A method for performing a quantum-logic operation on a quantum computer. The method includes enacting classical pebbling on an initial computation graph G defining the quantum-logic operation; extracting a quantum circuit B based on a sequence of steps obtained from the classical pebbling, that sequence including at least one computation step and at least one measurement-based uncomputation step; executing the quantum circuit B on a qubit register of the quantum computer; recording at least one measurement result of the at least one measurement-based uncomputation step of the quantum circuit B as executed on the qubit register; constructing a clean-up computation graph G' based on the at least one measurement result; enacting reversible pebbling on the clean-up computation graph G'; extracting a quantum circuit B' based on a sequence of steps obtained from the reversible pebbling, that sequence including computation and uncomputation steps; and executing the quantum circuit B' on the qubit register.

20 Claims, 9 Drawing Sheets

(56) References Cited

U.S. PATENT DOCUMENTS

2017/0147303 A1* 5/2017 Amy .................. G06F 8/436
2018/0123597 A1* 5/2018 Sete .................. H03K 19/195
2019/0361675 A1* 11/2019 Haener .............. G06F 7/49989

OTHER PUBLICATIONS

Bhattacharjee, D., etal., Reversible Pebble Games for Reducing Qbits in Hierarchical Quantum Circuit Synthesis, 2019, IEEE, 49th Intl. Symposium on Multi-Valued Logic, pp. 102-107 (Year: 2019).*

"Spooky Pebble Games and Irreversible Uncomputation", Retrieved from: https://algassert.com/post/1905, Aug. 25, 2019, 06 Pages.

Bravyi, et al., "Trading Classical and Quantum Computational Resources", In Journal of Physical Review X, vol. 6, Issue 2, Jun. 29, 2016, 14 Pages.

Meuli, et al., "Reversible Pebbling Game for Quantum Memory Management", In Proceedings of Design, Automation & Test in Europe Conference & Exhibition, Mar. 25, 2019, pp. 288-291.

Peng, et al., "Simulating Large Quantum Circuits on a Small Quantum Computer", In Repository of arXiv:1904.00102, Mar. 29, 2019, 18 Pages.

"International Search Report and Written Opinion Issued in PCT Application No. PCT/US2021/017202", dated Jun. 1, 2021, 22 Pages.

Královič, Richard, "Time and Space Complexity of Reversible Pebbling", In Journal of RAIRO-Theoretical Informatics and Applications, vol. 38, No. 2, Apr. 1, 2004, pp. 159-161.

* cited by examiner

RUNTIME QUANTUM-MEMORY MANAGEMENT

BACKGROUND

A quantum computer is a physical machine configured to execute logical operations based on or influenced by quantum-mechanical phenomena. Such logical operations may include, for example, mathematical computation. Current interest in quantum-computer technology is motivated by analysis suggesting that the computational efficiency of an appropriately configured quantum computer may surpass that of any practicable non-quantum computer when applied to certain types of problems. Such problems include computer modeling of natural and synthetic quantum systems, integer factorization, data searching, and function optimization as applied to systems of linear equations and machine learning. Moreover, it has been predicted that continued miniaturization of conventional computer logic structures will ultimately lead to the development of nanoscale logic components that exhibit quantum effects, and must therefore be addressed according to quantum-computing principles.

SUMMARY

One aspect of this disclosure relates to a method for performing a quantum-logic operation on a quantum computer. Enacted in a controller system of the quantum computer, the method comprises: enacting classical pebbling on an initial computation graph G defining the quantum-logic operation; extracting a quantum circuit B based on a sequence of steps obtained from the classical pebbling, that sequence including at least one computation step and at least one measurement-based uncomputation step; executing the quantum circuit B on a qubit register of the quantum computer; recording at least one measurement result of the at least one measurement-based uncomputation step of the quantum circuit B as executed on the qubit register; constructing a clean-up computation graph G' based on the at least one measurement result; enacting reversible pebbling on the clean-up computation graph G'; extracting a quantum circuit B' based on a sequence of steps obtained from the reversible pebbling, that sequence including computation and uncomputation steps; and executing the quantum circuit B' on the qubit register.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

Figure 1:
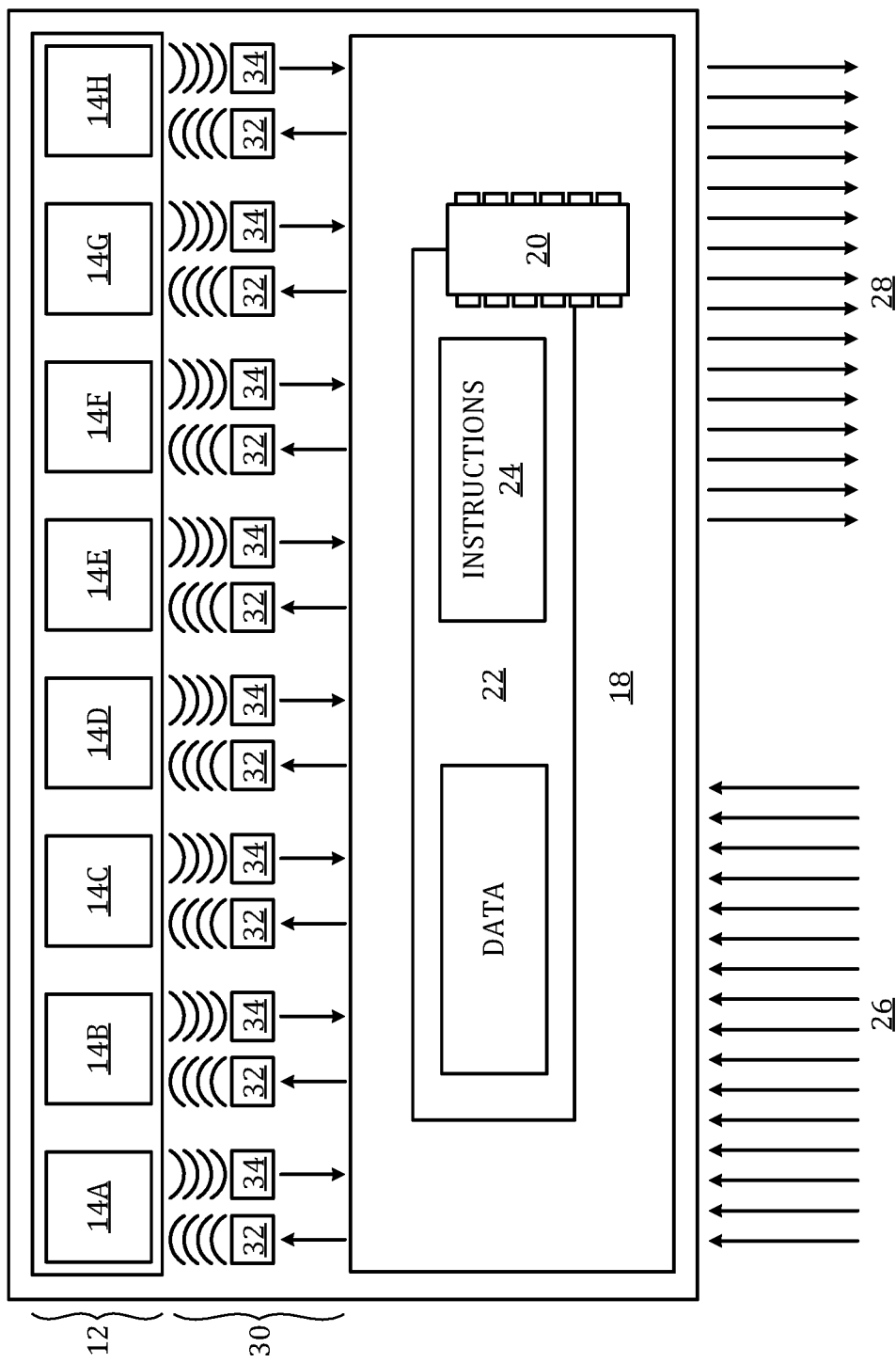
FIG. 1 shows aspects of an example quantum computer.

A quantum-computer algorithm may operate on many qubits of quantum data. However, most of the quantum-gate operations supported by a quantum computer address only one or two qubits concurrently. A technique called 'decomposition' is used, therefore, to break down multi-qubit quantum algorithms into combinations and sequences of elementary quantum-gate operations. Generally speaking, such decomposition requires temporary storage of intermediate results in a register of ancilla qubits, which is a limited resource. Moreover, due to the nature of quantum measurement, the qubits storing the intermediate results cannot easily be reset to accommodate subsequent data, but must be 'cleaned up' into a known classical state prior to reuse. A useful clean-up procedure is the process of 'uncomputation', where the sequence of quantum operations originally applied to a qubit is subsequently applied in reverse, ideally returning the qubit to its original state.

In some implementations, the decomposition of a complex quantum algorithm into an efficient sequence of elementary computation and uncomputation operations is guided by execution of a 'reversible pebble game'. In that strategy, the efficient sequence is determined during compilation of the quantum algorithm and therefore cannot adapt to unpredictable runtime events. Examples of unpredictable runtime events are relatively common, however. They include adaptive quantum-gate operations determined during program execution based on one or more measurement outcomes. Other examples include temporary or permanent unavailability of a qubit due to a hardware defect revealed during program execution.

For a quantum computation in which the elementary steps obey a linear-dependency relation, measurement-based uncomputation can reduce the cost of the corresponding pebble game significantly. One way to exploit this feature is to simply measure a qubit to attempt to reset it, instead of applying a costly uncomputation sequence. However, the success rate of resetting a qubit in one measurement is expected to be 50%. The other 50% of the time, it is expected that an error is introduced into the quantum computation, such that a modified uncomputation sequence must now be applied in order to correct the error. In some instances, the measured qubit can be used for subsequent computation even before the error is corrected.

In view of the above context, an adaptive, runtime, quantum-memory management strategy is disclosed herein. This strategy is based on a combination of classical and reversible pebble games applicable to any dependence relation and, in principle, to any quantum algorithm decomposable into elementary quantum-gate operations. Disclosed also is a method for runtime quantum-memory management that adaptively and dynamically chooses the appropriate uncomputation based on the interleaving of measurement results. This method is based on an adaptive algorithm that combines reversible and classical pebble games to determine adaptive compute-uncompute strategies during runtime, based on the success or failure of intermediate attempts to reset qubits by measurement. The method supports a runtime profiler that aggressively frees up qubit memory during quantum computation.

Quantum Computer Architecture

Prior to exploring runtime quantum-memory management, some aspects of quantum-computer architecture will first be described. Turning now to the drawings, FIG. 1 shows aspects of an example quantum computer 10 configured to execute quantum-logic operations (vide infra). Whereas conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes at least one qubit register 12 comprising an array of qubits 14. The illustrated qubit register is eight qubits in length; qubit registers comprising longer and shorter qubit arrays are also envisaged, as are quantum computers comprising two or more qubit registers of any length.

Qubits 14 of qubit register 12 may take various forms, depending on the desired architecture of quantum computer 10. Each qubit may comprise: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples. More generally, each qubit 14 may comprise any particle or system of particles that can exist in two or more discrete quantum states that can be measured and manipulated experimentally. For instance, a qubit may be implemented in the plural processing states corresponding to different modes of light propagation through linear optical elements (e.g., mirrors, beam splitters and phase shifters), as well as in states accumulated within a Bose-Einstein condensate.

Figure 2:
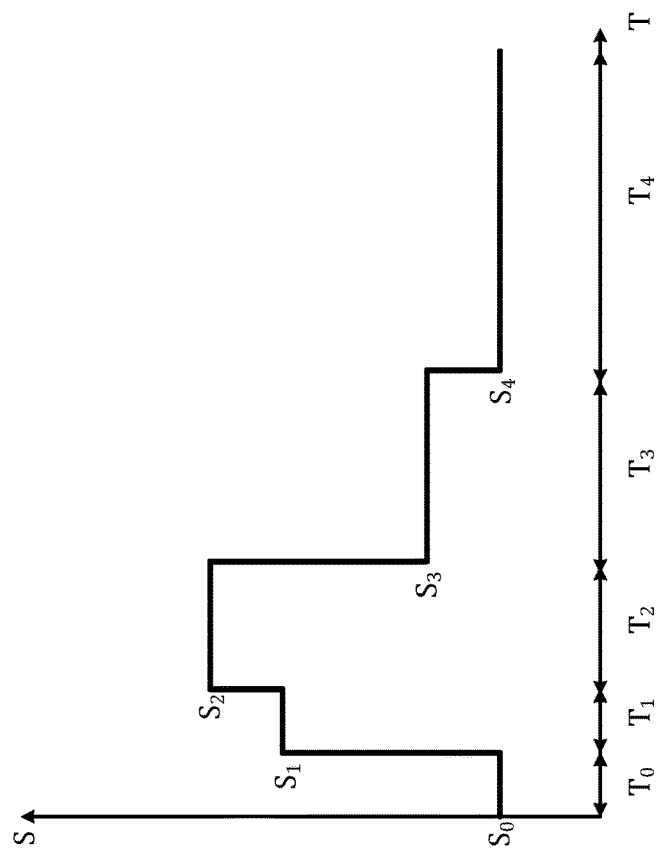
FIG. 2 illustrates a Bloch sphere, which graphically represents the quantum state of one qubit of a quantum computer.

FIG. 2 is an illustration of a Bloch sphere 16, which provides a graphical description of some quantum mechanical aspects of an individual qubit 14. In this description, the north and south poles of the Bloch sphere correspond to the standard basis vectors $|0\rangle$ and $|1\rangle$, respectively—up and down spin states, for example, of an electron or other fermion. The set of points on the surface of the Bloch sphere comprise all possible pure states $|\psi\rangle$ of the qubit, while the interior points correspond to all possible mixed states. A mixed state of a given qubit may result from decoherence, which may occur because of undesirable coupling to external degrees of freedom.

Returning now to FIG. 1, quantum computer 10 includes a controller 18. The controller may include at least one processor 20 and associated computer memory 22. A processor 20 of controller 18 may be coupled operatively to peripheral componentry, such as network componentry, to enable the quantum computer to be operated remotely. A processor 20 of controller 18 may take the form of a central processing unit (CPU), a graphics processing unit (GPU), or the like. As such, the controller may comprise classical electronic componentry. The terms 'classical' and 'non-quantum' are applied herein to any component that can be modeled accurately as an ensemble of particles without considering the quantum state of any individual particle. Classical electronic components include integrated, microlithographed transistors, resistors, and capacitors, for example. Computer memory 22 may be configured to hold program instructions 24 that cause processor 20 to execute any function or process of the controller. In examples in which qubit register 12 is a low-temperature or cryogenic device, controller 18 may include control componentry operable at low or cryogenic temperatures—e.g., a field-programmable gate array (FPGA) operated at 77K. In such examples, the low-temperature control componentry may be coupled operatively to interface componentry operable at normal temperatures.

Controller 18 of quantum computer 10 is configured to receive a plurality of inputs 26 and to provide a plurality of outputs 28. The inputs and outputs may each comprise digital and/or analog lines. At least some of the inputs and outputs may be data lines through which data is provided to and/or extracted from the quantum computer. Other inputs may comprise control lines via which the operation of the quantum computer may be adjusted or otherwise controlled.

Controller 18 is operatively coupled to qubit register 12 via quantum interface 30. The quantum interface is configured to exchange data bidirectionally with the controller. The quantum interface is further configured to exchange signal corresponding to the data bidirectionally with the qubit register. Depending on the architecture of quantum computer 10, such signal may include electrical, magnetic, and/or optical signal. Via signal conveyed through the quantum interface, the controller may interrogate and otherwise influence the quantum state held in the qubit register, as defined by the collective quantum state of the array of qubits 14. To this end, the quantum interface includes at least one modulator 32 and at least one demodulator 34, each coupled operatively to one or more qubits of the qubit register. Each modulator is configured to output a signal to the qubit register based on modulation data received from the controller. Each demodulator is configured to sense a signal from the qubit register and to output data to the controller based on the signal. The data received from the demodulator may, in some examples, be an estimate of an observable to the measurement of the quantum state held in the qubit register. Taken together, the controller, modulator, and demodulator may be referred to as a 'controller system'.

In some examples, suitably configured signal from modulator 32 may interact physically with one or more qubits 14 of qubit register 12 to trigger measurement of the quantum state held in one or more qubits. Demodulator 34 may then sense a resulting signal released by the one or more qubits pursuant to the measurement, and may furnish the data corresponding to the resulting signal to controller 18. Stated another way, the demodulator may be configured to output, based on the signal received, an estimate of one or more observables reflecting the quantum state of one or more qubits of the qubit register, and to furnish the estimate to the controller. In one non-limiting example, the modulator may provide, based on data from the controller, an appropriate voltage pulse or pulse train to an electrode of one or more qubits, to initiate a measurement. In short order, the demodulator may sense photon emission from the one or more qubits and may assert a corresponding digital voltage level on a quantum-interface line into the controller. Generally speaking, any measurement of a quantum-mechanical state is defined by the operator O corresponding to the observable to be measured; the result R of the measurement is guaranteed to be one of the allowed eigenvalues of O. In quantum computer 10, R is statistically related to the qubit-register state prior to the measurement, but is not uniquely determined by the qubit-register state.

Pursuant to appropriate input from controller 18, quantum interface 30 may be configured to implement one or more quantum-logic gates to operate on the quantum state held in qubit register 12. Whereas the function of each type of logic gate of a classical computer system is described according to a corresponding truth table, the function of each type of quantum gate is described by a corresponding operator matrix. The operator matrix operates on (i.e., multiplies) the complex vector representing the qubit register state and effects a specified rotation of that vector in Hilbert space.

For example, the Hadamard gate H is defined by $$H = \frac{1}{\sqrt{2}}\begin{bmatrix} 1 & 1 \\ 1 & -1 \end{bmatrix} \quad (1)$$

The H gate acts on a single qubit; it maps the basis state $|0\rangle$ to $(|0\rangle+|1\rangle)/\sqrt{2}$, and maps $|1\rangle$ to $(|0\rangle-|1\rangle)/\sqrt{2}$. Accordingly, the H gate creates a superposition of states that, when measured, have equal probability of revealing $|0\rangle$ or $|1\rangle$.

The phase gate S is defined by $$S = \begin{bmatrix} 1 & 0 \\ 0 & e^{i\pi/2} \end{bmatrix}. \quad (2)$$

The S gate leaves the basis state $|0\rangle$ unchanged but maps $|1\rangle$ to $e^{i\pi/2}|1\rangle$). Accordingly, the probability of measuring either $|0\rangle$ or $|1\rangle$ is unchanged by this gate, but the phase of the quantum state of the qubit is shifted. This is equivalent to rotating ψ by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP = \begin{bmatrix} 1 & 0 & 0 & 0 \\ 0 & 0 & 1 & 0 \\ 0 & 1 & 0 & 0 \\ 0 & 0 & 0 & 1 \end{bmatrix}. \quad (3)$$

The foregoing list of quantum gates and associated operator matrices is non-exhaustive, but is provided for ease of illustration. Other quantum gates include Pauli-X, -Y, and -Z gates, the NOT gate, additional phase-shift gates, the $\sqrt{SWAP}$ gate, controlled cX, cY, and cZ gates, and the Toffoli, Fredkin, Ising, and Deutsch gates, as non-limiting examples.

Figure 3:
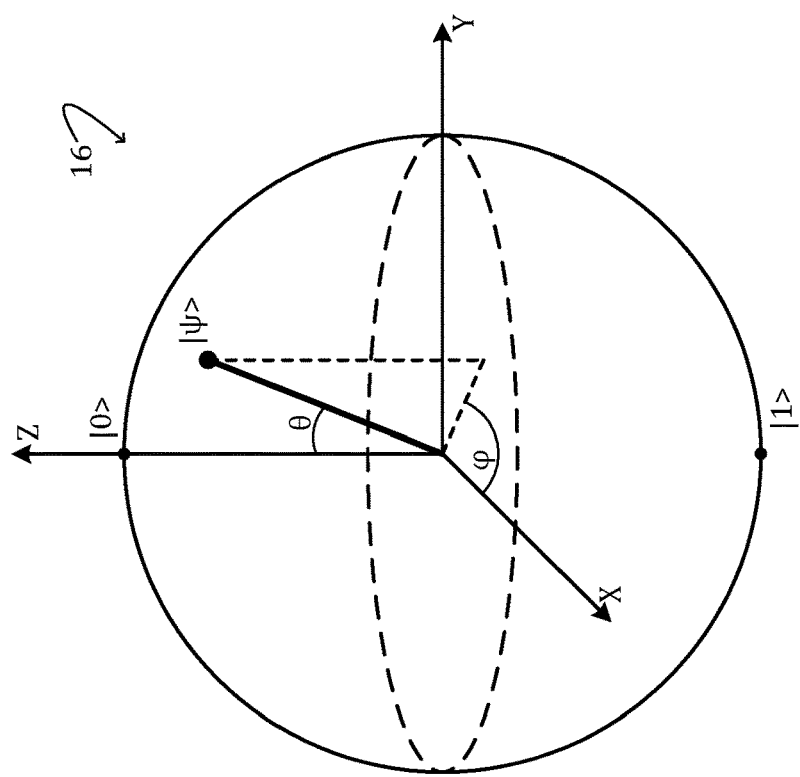
FIG. 3 shows aspects of an example signal waveform for effecting a quantum-gate operation in a quantum computer.

Continuing in FIG. 1, suitably configured signal from modulators 32 of quantum interface 30 may interact physically with one or more qubits 14 of qubit register 12 so as to assert any desired quantum-gate operation. As noted above, the desired quantum-gate operations are specifically defined rotations of a complex vector representing the qubit register state. In order to effect a desired rotation O, one or more modulators of quantum interface 30 may apply a predetermined signal level $S_i$ for a predetermined duration $T_i$. In some examples, plural signal levels may be applied for plural sequenced or otherwise associated durations, as shown in FIG. 3, to assert a quantum-gate operation on one or more qubits of the qubit register. In general, each signal level $S_i$ and each duration $T_i$ is a control parameter adjustable by appropriate programming of controller 18.

The terms 'oracle' and 'quantum program' are used herein to describe a predetermined sequence of elementary quantum-gate and/or measurement operations executable by quantum computer 10. An oracle may be used to transform the quantum state of qubit register 12 to effect a classical or non-elementary quantum-gate operation or to apply a density operator, for example. In some examples, an oracle may be used to enact a predefined 'black-box' operation f(x), which may be incorporated in a complex sequence of operations. To ensure adjoint operation, an oracle mapping n input qubits $|x\rangle$ to m output or ancilla qubits $|y\rangle$ =f(x) may be defined as a quantum gate $O(|x\rangle \otimes |y\rangle)$ operating on the n+m qubits. In this case, O may be configured to pass the n input qubits unchanged but combine the result of the operation f (x) with the ancillary qubits via an XOR operation, such that $O(|x\rangle \otimes |y\rangle)=|x\rangle \otimes |y+f(x)\rangle$. A state-preparation oracle is an oracle configured to generate a quantum state of specified qubit length.

Implicit in the description herein is that each qubit 14 of qubit register 12 may be interrogated via quantum interface 30 so as to reveal with confidence the standard basis vector $|0\rangle$ or $|1\rangle$ that characterizes the quantum state of that qubit. In some implementations, however, measurement of the quantum state of a physical qubit may be subject to error. Accordingly, any qubit 14 may be implemented as a logical qubit, which includes a grouping of physical qubits measured according to an error-correcting oracle that reveals the quantum state of the logical qubit with confidence.

Quantum Memory Management

A decomposed quantum computation can be modeled as a directed acyclic graph, G=(V,E), called a 'computation graph', where each vertex V corresponds to an operation, and where there is an edge (v, w)∈E if the computation of v depends on the result of the computation w. A subset of output vertices $V_O \subseteq V$ describes the operations that carry the final computation results. As a simple example, in order to compute the length of the hypotenuse of a right triangle with sides of length a and b, the computation $\sqrt{a^2+b^2}$ can be represented by a graph with four vertices, which represent the two squaring operations, the addition operation, and the square-root operation.

A pebble configuration is a subset P⊆V of the vertices of G. A vertex v is 'pebbled' in configuration P if v∈P. In a pebble game the goal is to find a sequence of configurations $P_1, P_2, \ldots, P_k$, such that $P_1=\emptyset$ and $P_k=V_O$. Different pebble games have different rules for moves, which govern how to get from one configuration $P_i$ to the next one $P_{i+1}$. In the classical pebble game, one can only pebble a vertex in a successive step if in both steps all dependent operations are pebbled—viz., $v \in \overline{P}_i \cap P_{i+1}$) $\wedge_{(v,w) \in E} w \in P_i \cap P_{i+1}$. That also implies that a pebble can be removed from a vertex without any constraint in the classical pebble game. The removal rule differs in reversible pebble games, where the same condition holds for removing a pebble as for adding one. Formally, this means $v \in P_i \Delta P_{i+1}) \wedge_{(v,w) \in E} w \in P_i \cap P_{i+1}$, where Δ denotes the symmetric difference of two sets. In both games, the number of pebbles available in any step is restricted to p pebbles, i.e., $|P_i| \leq p$ for all steps i. The classical pebble number of a graph is the smallest number p such that there exists some k for which the classical pebble game can be won using p pebbles. The reversible pebble number is analogously defined for reversible pebble games. Since the reversible pebble game is strictly more restrictive than the classical pebble game, the reversible pebble number can never be smaller than the classical pebble number.

Figure 4:
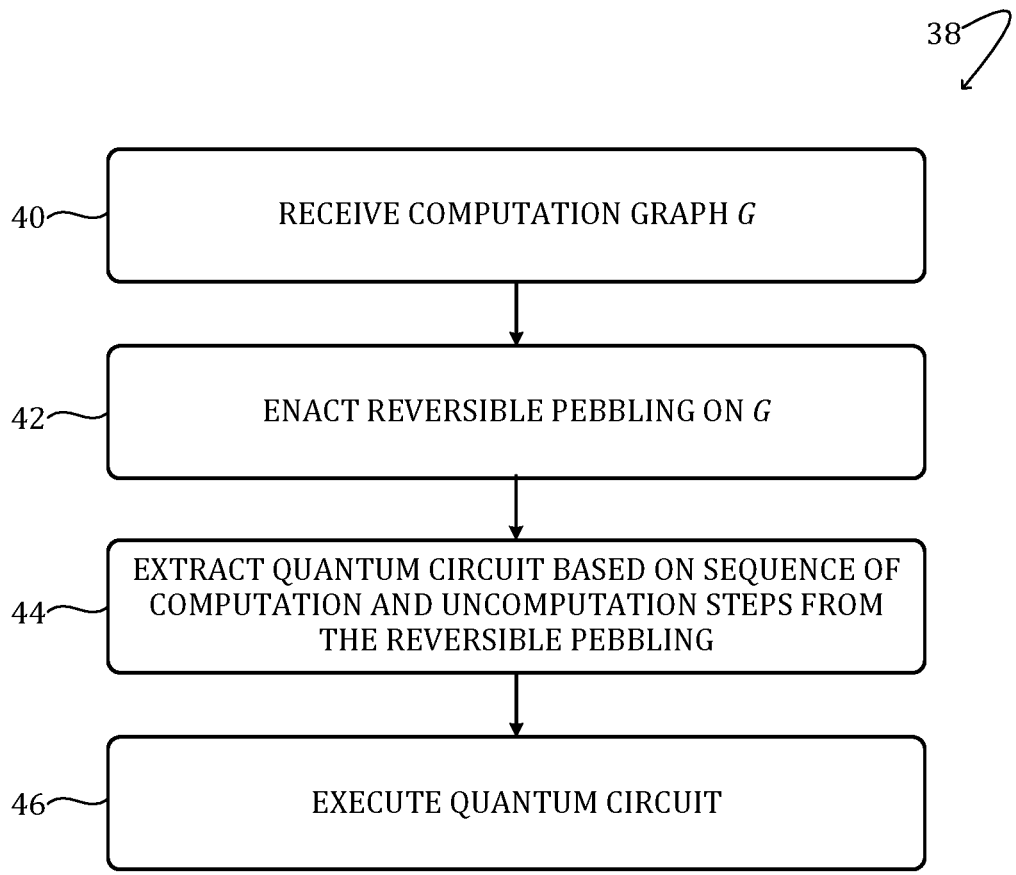
FIG. 4 shows aspects of a comparative method for performing quantum-logic operations on a quantum computer.

FIG. 4 shows aspects of a comparative method 38 for performing quantum-logic operations on a quantum computer. Method 38 employs a quantum-memory management strategy based on reversible pebbling. For additional details, the interested reader is referred to G. Meuli, M. Soeken, M. Roetteler, N. Bjorner, and G. De Micheli, *Reversible pebble game for quantum memory management*, DATE 22 (2019), 288-291, the entirety of which is hereby incorporated by reference herein, for all purposes. Method 38 and subsequent methods illustrated herein may be enacted in a controller system of a quantum computer.

At 40 of method 38 a computation graph G is received. At 42 reversible pebbling is enacted on G. At 44 a quantum circuit is extracted based on a sequence of computation and uncomputation steps obtained from the reversible pebbling. At 46 the extracted quantum circuit is executed.

Figure 5:
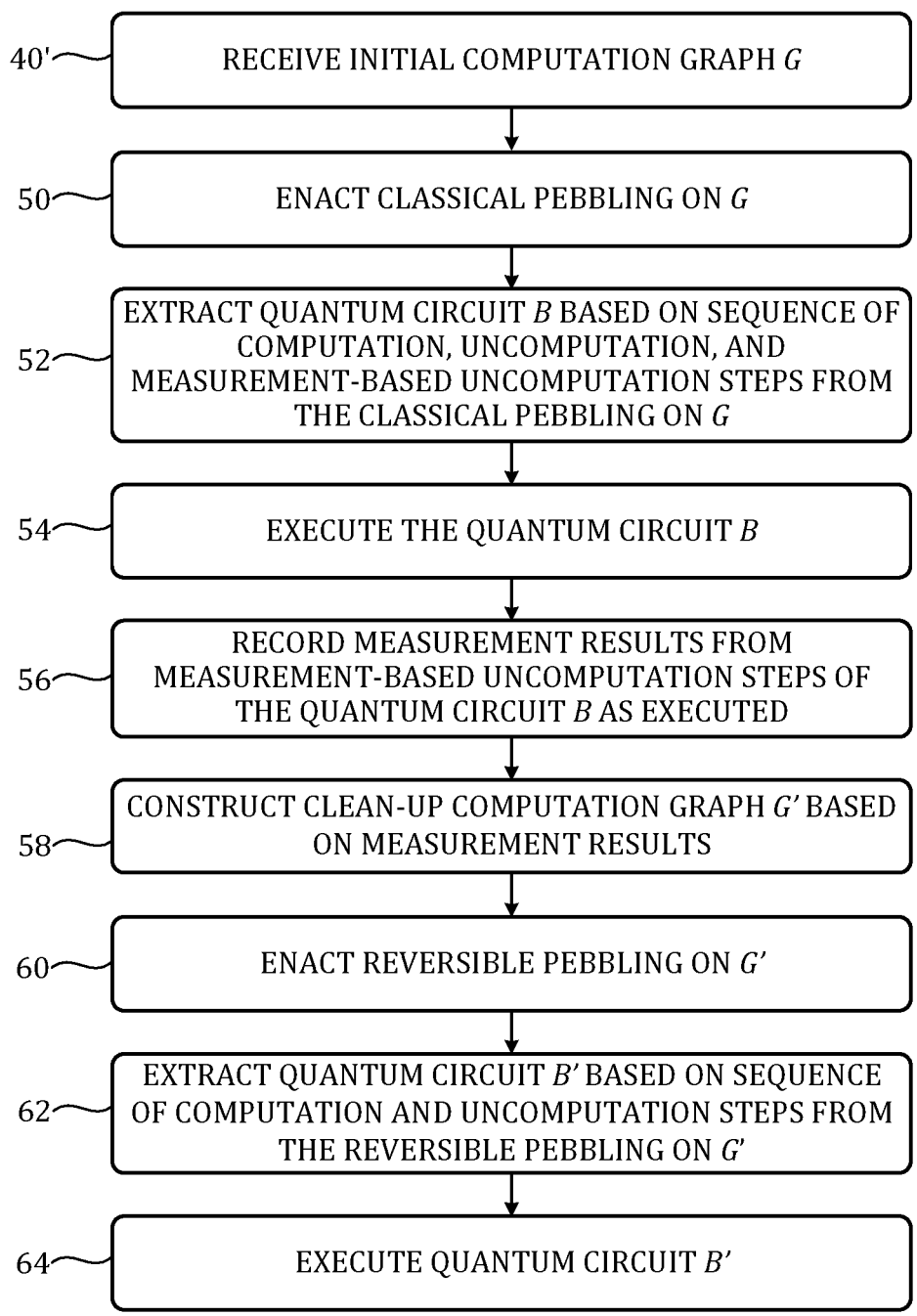
FIG. 5 shows aspects of an example method for performing quantum-logic operations on a quantum computer.

FIG. 5 shows aspects of an example method 48 for performing quantum-logic operations on a quantum computer. Method 48 embodies a quantum-memory management strategy that, in a hybrid manner, enacts a computation based on a classical pebbling strategy and then corrects errors that may result from measurement-based uncomputation. The errors are corrected using a clean-up circuit based on a reversible pebbling strategy.

At 40' of method 48, an initial computation graph G is received. The initial computation graph G defines a quantum logic operation performed in method 48. In some examples, the initial computation graph G may comprise a tree structure or other topologic structure.

At 50 classical pebbling is enacted on G. At 52 a quantum circuit B is extracted based on a sequence of steps obtained from the classical pebbling. The sequence of steps obtained from the classical pebbling includes at least one computation step and at least one measurement-based uncomputation step. The sequence may also include one or more uncomputation steps that are not measurement-based. In some examples, the at least one measurement-based uncomputation step corresponds to one of a restricted subset of elementary operations of the initial computation graph G. In some examples, extracting the quantum circuit B' comprises selecting from a plurality of pre-computed quantum circuits corresponding each to a possible measurement result of the at least one measurement-based uncomputation step.

At 54 the extracted quantum circuit B is executed on a qubit register of the quantum computer. At 56 measurement results deriving from the execution of quantum circuit B on the qubit register are recorded. More particularly, at least one measurement result of the at least one measurement-based uncomputation step of quantum circuit B is recorded.

At 58 a clean-up computation graph G' is constructed based on the measurement results. At 60 reversible pebbling is enacted on the clean-up computation graph G'. At 62 a clean-up quantum circuit B' is extracted based on a sequence of steps obtained from the reversible pebbling, that sequence including computation and uncomputation steps. At 64 the clean-up quantum circuit B' is executed on the qubit register.

An advantage of method 48 is that it can potentially find quantum circuits that require fewer qubits, relative to method 38 of FIG. 4. However, the clean-up computation graph G' created at 58 depends on the measurement outcomes extracted at 56. Consequently, the reversible pebbling strategy for G' cannot be precomputed during compilation, but must be computed after execution of the quantum algorithm has already begun.

No aspect of any of the methods herein should be understood in a limiting sense, because numerous variations, extensions, and omissions are also envisaged. In some examples, an indication of an available number of qubits of the qubit register may be received as input. There, one or more of the classical pebbling and the reversible pebbling may be enacted further based on the available number of qubits. In some examples, the classical pebbling may be enacted further based on a cost of implementation of the sequence of steps obtained from the classical pebbling. Likewise, the reversible pebbling may be enacted based on a cost of implementation of the sequence of steps obtained from the reversible pebbling.

Features of other hybrid quantum-classical simulation schemes are described in S. Bravyi, G. Smith, and J. Smolin, *Trading classical and quantum computational resources*, Phys. Rev. X 6 (2016), 021043 and T. Peng, A. Harrow, M. Ozols, and X. Wu, *Simulating large quantum circuits on a small quantum computer*, arXiv:1904:00102 (2019), the entirety of which are hereby incorporated by reference herein, for all purposes.

Figure 7:
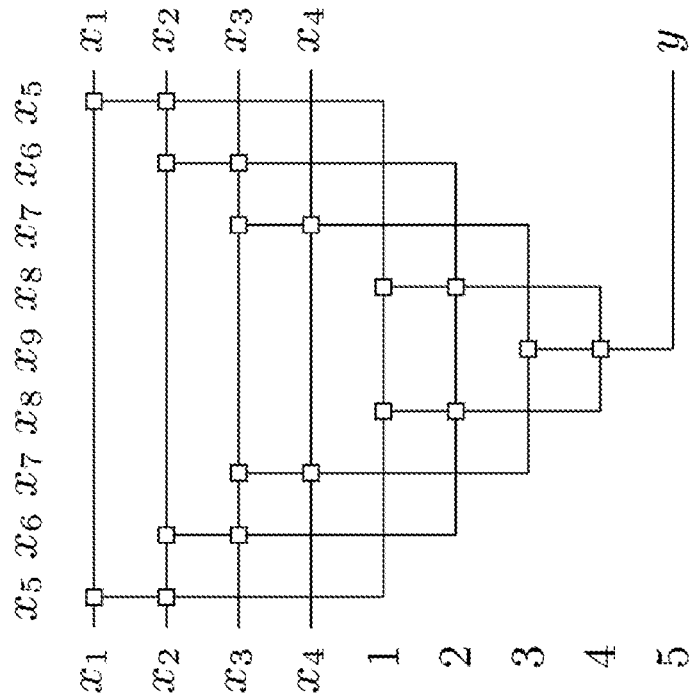
FIGS. 7 through 9 show aspects of example quantum circuits based on the computation graph of FIG. 6.
Figure 6:
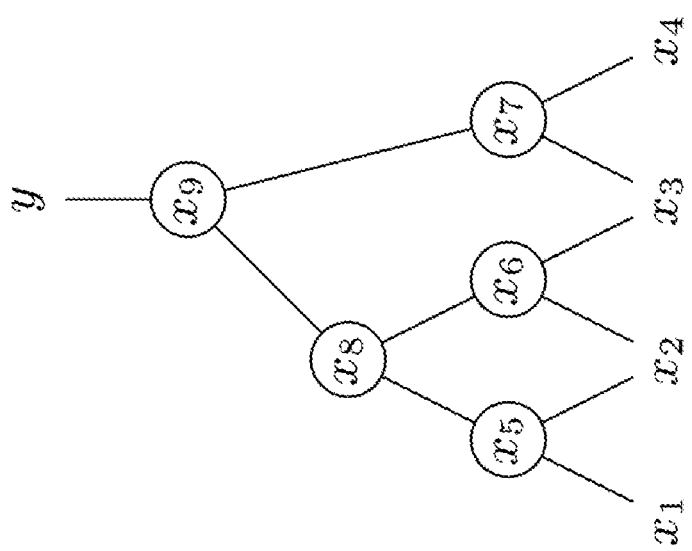
FIG. 6 shows aspects of an example computation graph.

Some aspects of method 48 may be better understood with reference to a concrete example. Consider the computation graph of FIG. 6, which has five vertices $V = x_5, x_6, x_7, x_8, x_9$ including output vertices $V_O = x_9$. Note that $x_1, x_2, x_3, x_4$ are inputs, which do not compute anything but represent computation values that are always accessible. In other words, vertices $x_5, x_6, x_7$ do not have any outgoing edges. Similarly, the output vertex $x_9$ has no incoming vertex, only a label y. One simple reversible pebbling strategy is the 'Bennett strategy', which does not assume any bound on the number of pebbles. It first computes all of the vertices in topological order and then uncomputes all of the vertices, except the output vertices, in reverse-topological order. FIG. 7 shows the resulting quantum circuit, which requires four helper qubits to store intermediate computation results. Note that the qubit holding the output value is not considered to be a helper qubit.

Figure 8:
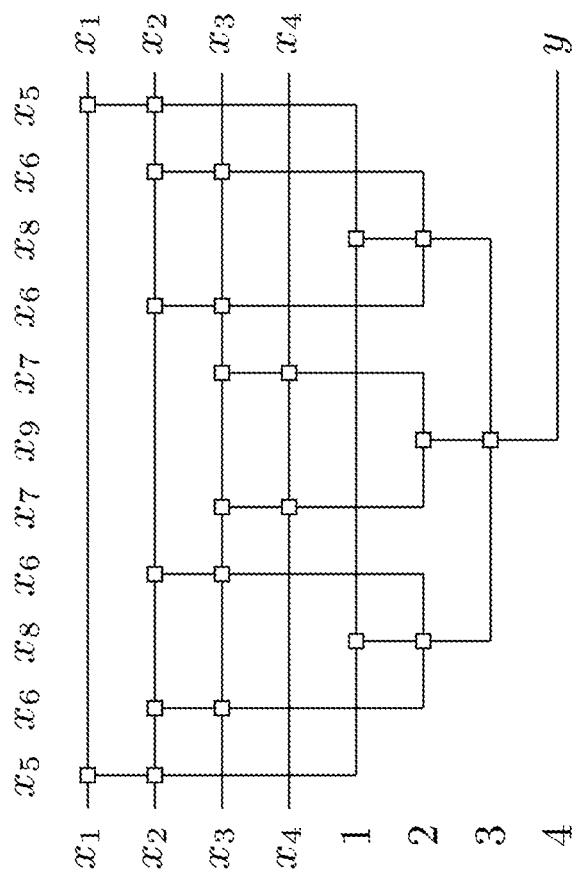

The quantum circuit of FIG. 7 is not the only possible solution. A more sophisticated reversible pebbling, such as a 'satisfiability' (SAT) solver, may yield the quantum circuit shown in FIG. 8. This solution requires additional computation and uncomputation steps but only requires three helper qubits. It can be shown that this number of helper qubits is optimal for the computation graph of FIG. 6 using reversible pebbling.

Figure 9:
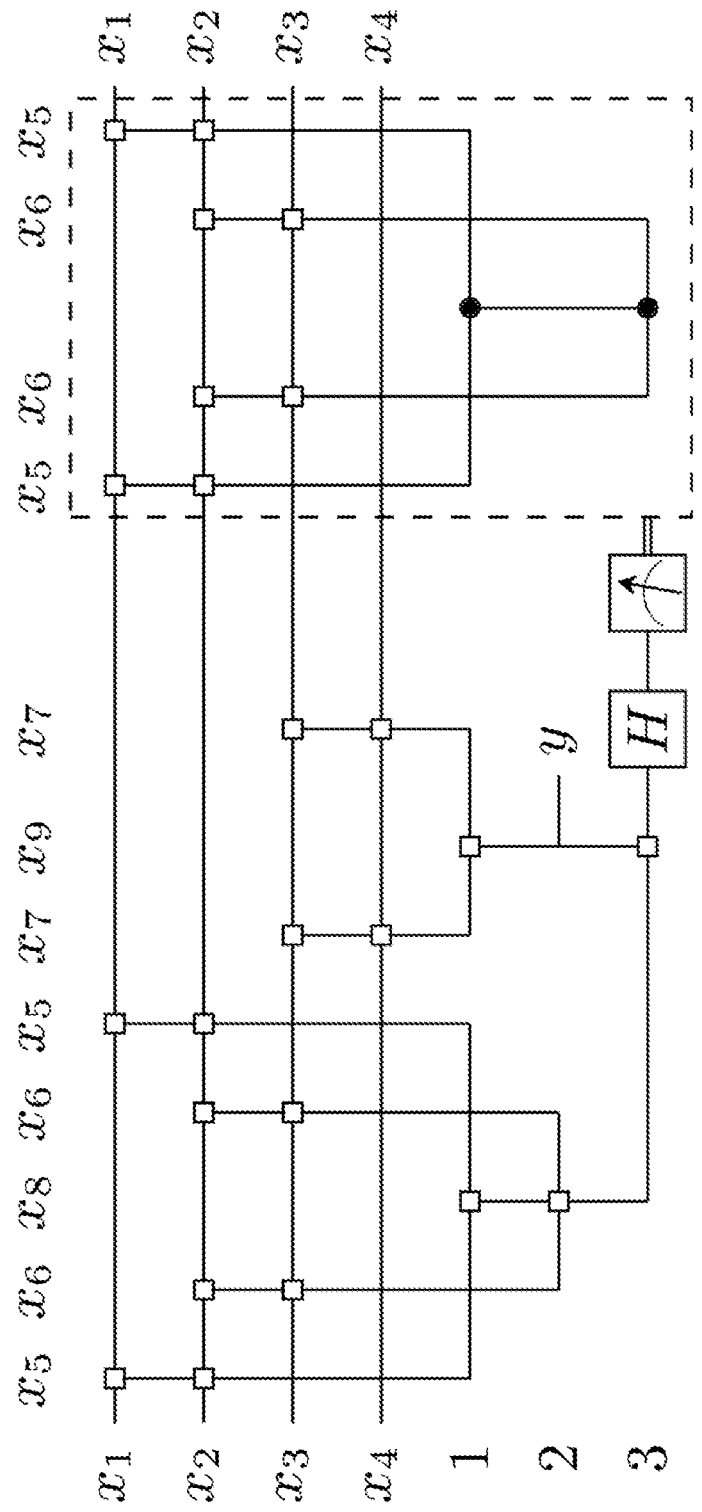

By applying method 48 of FIG. 5 the quantum circuit of FIG. 9 is obtained. Note that vertices $x_5, x_6$ and $x_7$ are uncomputed reversibly, as they have no outgoing edge. Vertex $x_8$ is uncomputed using measurements, because the computation results of the outgoing edges are unavailable at the point of uncomputation. If the measurement is successful, then the computation is finished. Otherwise, the clean-up circuit shown in the dashed block is executed. In this example, as there are only two possible outcomes, the clean-up circuit can be pre-computed. In general, however, the required number of clean-up circuits is exponential in the number of measurement-based uncomputations, so precomputation of all of the possible outcomes is not feasible. The reader will observe that the circuit of FIG. 9 requires only two helper qubits, which is not achievable using reversible pebbling alone.

Method 48 of FIG. 5 can be generalized such that instead of a single round of classical pebbling, classical pebble games are used also to clean up the quantum circuit initially obtained. That approach is illustrated in FIG. 10.

Figure 10:
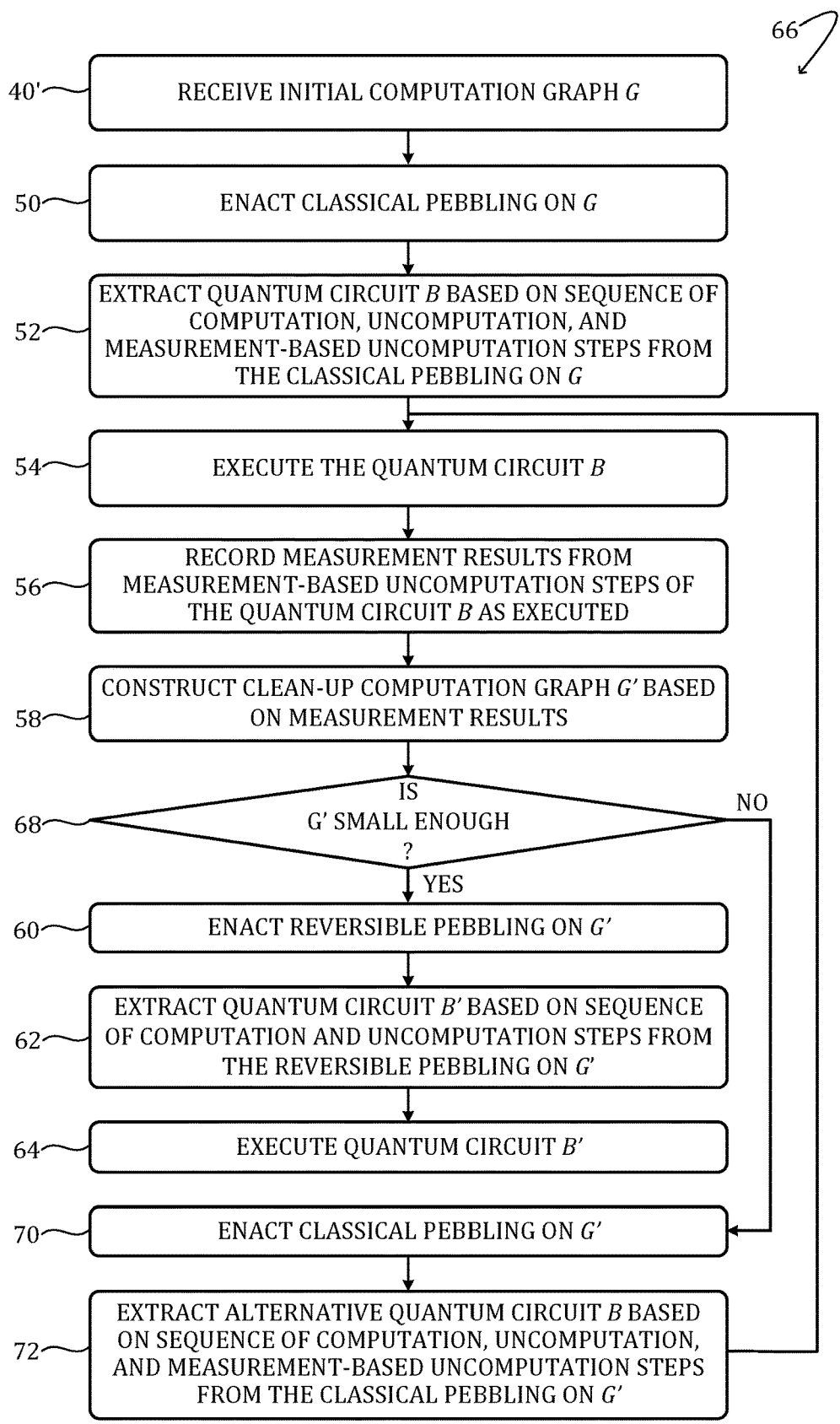
FIG. 10 shows aspects of another example method for performing quantum-logic operations on a quantum computer.

FIG. 10 shows aspects of an example method 66 for performing quantum-logic operations on a quantum computer. At 68 of method 66, after clean-up computation graph G' has been constructed, it is determined whether G' is small enough (i.e., below a threshold size). Only if G' is small enough are the subsequent steps of enacting reversible pebbling on G' and extracting quantum circuit B' enacted. If G' is not small enough, then execution of method 66 proceeds to 70, where classical pebbling is enacted on G', and then to 72, where an alternative quantum circuit (also labeled B in FIG. 10) is extracted based on a sequence of computation, uncomputation, and measurement-based uncomputation steps from the classical pebbling on G'. After 72, the method returns to 54, where the alternative quantum circuit is executed.

More generally, various implementations are envisaged wherein reversible pebbling is enacted and a quantum circuit B' extracted and executed only if an estimated cost of executing the quantum circuit B' is below a threshold. Such implementations may include explicit estimation of the estimated cost of executing the quantum circuit B'. In these examples, execution of the alternative quantum circuit is followed by recording at least one subsequent measurement result and constructing at least one subsequent clean-up computation graph, in an iterative manner. While, in the example of FIG. 10, the estimated cost increases with increasing size of the clean-up computation graph G, other surrogates of the estimated cost are also envisaged.

Classical pebble games rely on measurement-based uncomputation. Accordingly, new errors may arise when trying to clean up each classically pebbled circuit. Nevertheless, the subset of operations that may require a clean-up is reduced at each iteration. Although increasing the number of iterations in which classical pebble games are used increases the number of operations to be performed, this strategy can advantageously reduce the number of required qubits.

Figure 11:
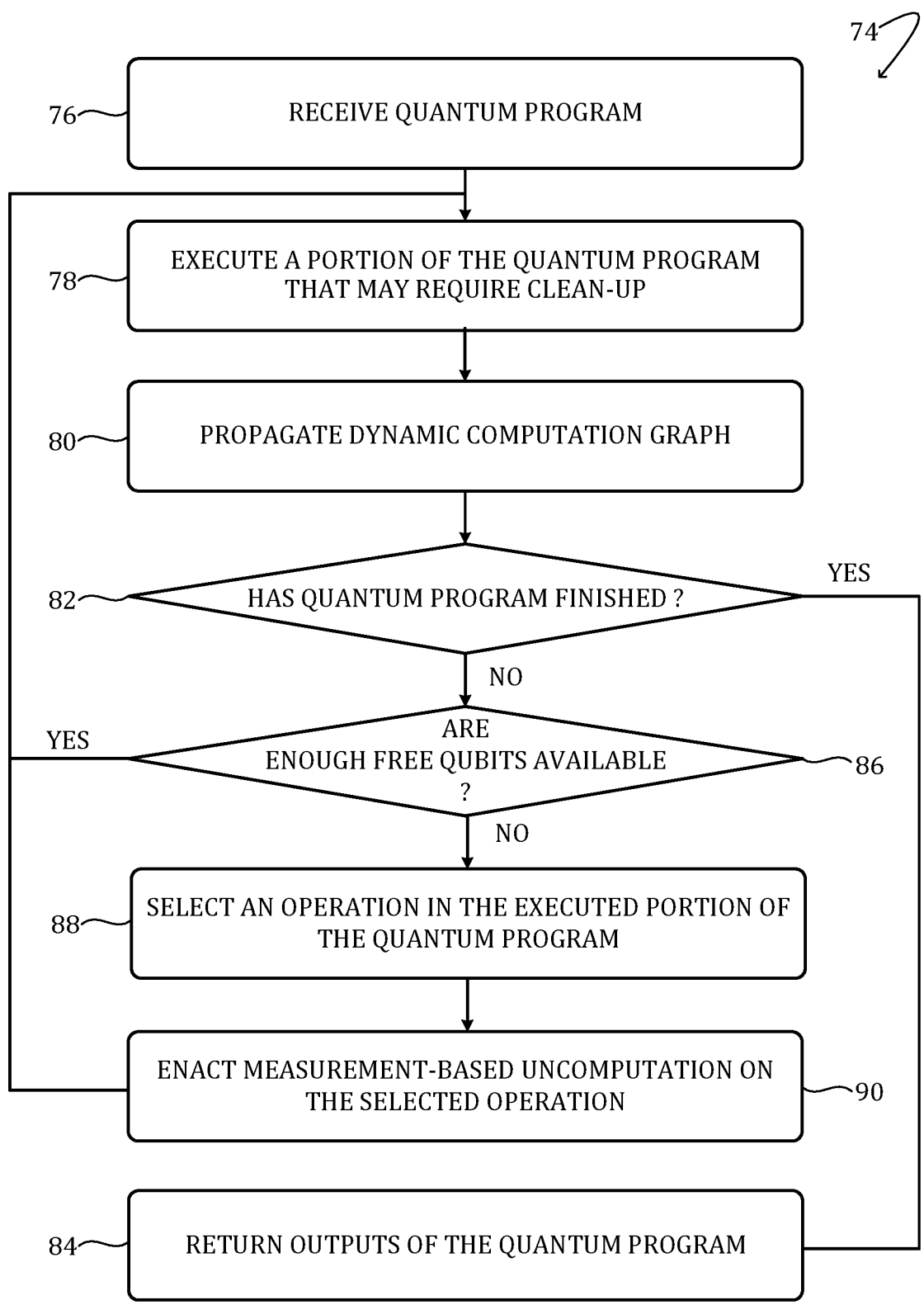
FIG. 11 shows aspects of an example method for executing a quantum program on a quantum computer.

In some implementations, method 48 of FIG. 5 may be used as a basis for a profiler, or quantum-memory manager, to be enacted in a controller system of a quantum computer. The profiler monitors quantum operations during execution of a quantum program and adaptively applies dynamic computation and uncomputation to free up qubits. An example of this strategy is shown in method 74 of FIG. 11, which is a method for executing a quantum program on a quantum computer.

The initial conditions for method 74 differ from those of the foregoing methods, in that a computation graph is not received or known necessarily at the outset of the method but is propagated during the execution of the quantum algorithm, under the control of the profiler. The profiler keeps track, in effect, of which computations are stored in which qubits and of the dependent computations. More particularly, method 92 monitors how many qubits are currently in use and how many qubits are still available for future computations. By comparing the number of free qubits to a threshold number, the profiler may decide to free up some existing qubits to ensure that sufficiently many clean qubits remain available. Qubits are freed by applying measurement-based uncomputation on an existing intermediate computation. Several scenarios are possible, and for each scenario a different strategy is required.

At 76 of method 74 a quantum program is received in the controller system of a quantum computer. At 78 a portion of the quantum program that may require clean-up is executed in the qubit register of the quantum computer. At 80 a dynamic computation graph defining the executed portion of the quantum program (e.g., 'initial' computation graph G in the examples above) is propagated. If, at 82, it is determined that the quantum program has finished, then outputs of the quantum program are returned, at 84. However, if the quantum program has not finished, then it is determined, at 86, whether a sufficient (i.e., above-threshold) number of free qubits are available. If a sufficient number of free qubits are available, then execution of method 74 returns to 78, where at least one subsequent portion of the quantum program is executed and at least one subsequent dynamic computation graph propagated.

However, if determination at 86 reveals that a sufficient (i.e., above-threshold) number of free qubits is not available, then an operation in the executed portion of the quantum program is selected, at 88. Then, at 90, measurement-based uncomputation is enacted on the selected operation in the qubit register. The measurement-based uncomputation may be employ aspects of method 48 of FIG. 5 or method 66 of FIG. 10, for example.

If measurement-based uncomputation is successful and the intermediate computation result is not required later by the quantum program (the best-case scenario), then the indicated qubits are freed by simple measurement. If measurement-based uncomputation is successful but the intermediate computation result is later required, then the situation is more involved. That scenario guarantees temporarily availability of some free qubits, but the intermediate result must be recomputed at a later point. Here, the number of dependent computations, and whether the respective intermediate results are already available on some qubits, influences how many qubits will be required for the subsequent re-computation. The operating strategy, accordingly, is to free up qubits of such a computation only if re-computation is not required shortly thereafter. Lastly, if measurement-based uncomputation is unsuccessful, then a clean-up quantum circuit must be computed at a later point. The effort to re-compute the operation is almost the same as the effort to clean up the error caused by measurement-based uncomputation. Moreover, if re-computation is necessary, then (the same) error clean-up and re-computation of the result can be enacted concurrently, to avoid redundant computational effort.

Method 92 admits of similar challenges as the foregoing hybrid pebbling approaches, inasmuch as the pebble game must be played during runtime of the quantum computation of interest. Furthermore, it is necessary to monitor various outcomes during program execution, to enable productive decision making on which qubits are to be freed and which are to be left alone. The quality of the decision making can be further improved via appropriate look-ahead strategies, provided that the profiler has access to the quantum program a priori. In some examples, accordingly, the profiler may be configured to look up one or more operations in the executed portions of the quantum program. Measurement-based uncomputation, at 90, may be enacted further based on the look-up. In these examples, the look-up may include evaluation of one or more cost functions applied to the executed portion of the quantum program. Similarly, method 74 may include heuristic static pre-analysis of the quantum program prior to executing any, some, or all portions of the quantum program.

To further summarize, one aspect of this disclosure is directed to a method, enacted in a controller system of a quantum computer, for performing a quantum-logic operation on the quantum computer. The method comprises: enacting classical pebbling on an initial computation graph G defining the quantum-logic operation; extracting a quantum circuit B based on a sequence of steps obtained from the classical pebbling, that sequence including at least one computation step and at least one measurement-based uncomputation step; executing the quantum circuit B on a qubit register of the quantum computer; recording at least one measurement result of the at least one measurement-based uncomputation step of the quantum circuit B as executed on the qubit register; constructing a clean-up computation graph G' based on the at least one measurement result; enacting reversible pebbling on the clean-up computation graph G'; extracting a quantum circuit B' based on a sequence of steps obtained from the reversible pebbling, that sequence including computation and uncomputation steps; and executing the quantum circuit B' on the qubit register.

In some implementations, the at least one measurement-based uncomputation step corresponds to one of a restricted subset of elementary operations of the initial computation graph G. In some implementations, extracting the quantum circuit B' comprises selecting from a plurality of pre-computed quantum circuits corresponding each to a possible measurement result of the at least one measurement-based uncomputation step. In some implementations, the method further comprises receiving as input an indication of an available number of qubits of the qubit register, wherein one or more of the classical pebbling and the reversible pebbling are enacted based on the available number of qubits. In some implementations, the classical pebbling is enacted based on a cost of implementation of each of the sequence of steps obtained from the classical pebbling, and the reversible pebbling is enacted based on a cost of implementation of each of the sequence of steps obtained from the reversible pebbling. In some implementations, the initial computation graph G comprises a tree structure. In some implementations, the reversible pebbling is enacted and the quantum circuit B' extracted and executed only if an estimated cost of executing the quantum circuit B' is below a threshold, the method further comprising estimating the estimated cost. In some implementations, the method further comprises, if the estimated cost is above the threshold: enacting classical pebbling on the clean-up computation graph G'; extracting an alternative quantum circuit based on a sequence of steps obtained from the classical pebbling of G'; and executing the alternative quantum circuit on the qubit register. In some implementations, execution of the alternative quantum circuit is followed by recording of at least one subsequent measurement result and constructing at least one subsequent clean-up computation graph in an iterative manner. In some implementations, the estimated cost increases with increasing size of the clean-up computation graph G'. In some implementations, the sequence of steps obtained from the classical pebbling includes at least one non-measurement-based uncomputation step.

Another aspect of this disclosure is directed to a method, enacted in a controller system of a quantum computer, for executing a quantum program on the quantum computer. The method comprises: receiving the quantum program; executing a portion of the quantum program in a qubit register of the quantum computer; propagating a dynamic computation graph defining the executed portion of the quantum program; selecting an operation in the executed portion of the quantum program; and enacting measurement-based uncomputation on the selected operation in the qubit register.

In some implementations, the method further comprises employing a look-up of one or more operations in the executed portion of the quantum program, wherein the measurement-based uncomputation is enacted based on the look-up. In some implementations, the look-up comprises evaluations of one or more cost functions applied to the executed portion of the quantum program. In some implementations, the method further comprises applying heuristic static pre-analysis of the quantum program prior to executing the portion of the quantum program. In some implementations, the operation is selected and the measurement-based uncomputation enacted only if fewer than a threshold number of free qubits are available in the qubit register. In some implementations, the method further comprises executing at least one subsequent portion of the quantum program and propagating at least one subsequent dynamic computation graph if greater than the threshold number of free qubits are available in the qubit register. In some implementations, the operation is selected and the measurement-based uncomputation enacted only if the quantum program is not finished, the method further comprising receiving an output of the quantum program if the quantum program is finished.

Another aspect of this disclosure is directed to a quantum computer comprising: a qubit register including a plurality of qubits; a modulator configured to implement one or more quantum-logic operations on the plurality of qubits; a demodulator configured to output data exposing a quantum state of the plurality of qubits; a controller operatively coupled to the modulator and to the demodulator; and computer memory holding instructions that cause the controller to: enact classical pebbling on an initial computation graph G defining the quantum-logic operation; extract a quantum circuit B based on a sequence of steps obtained from the classical pebbling, that sequence including at least one computation step and at least one measurement-based uncomputation step; execute the quantum circuit B on a qubit register of the quantum computer; record at least one measurement result of the at least one measurement-based uncomputation step of the quantum circuit B as executed on the qubit register; construct a clean-up computation graph G' based on the at least one measurement result; enact reversible pebbling on the clean-up computation graph G'; extract a quantum circuit B' based on a sequence of steps obtained from the reversible pebbling, that sequence including computation and uncomputation steps; and execute the quantum circuit B' on the qubit register.

In some implementations, the quantum-logic operation is a selected quantum-logic operation in a portion of a quantum program, and the instructions further cause the controller to: execute the portion of the quantum program; propagate the initial computation graph, which defines the portion of the quantum program; and enact measurement-based uncomputation on the selected operation if a number of free qubits in a qubit register of the quantum computer is below a threshold.

This disclosure is presented by way of example and with reference to the appended drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted in a controller system of a quantum computer, a method for performing a quantum-logic operation on the quantum computer, the method comprising:
    enacting classical pebbling on an initial computation graph G defining the quantum-logic operation;
    extracting a quantum circuit B based on a sequence of steps obtained from the classical pebbling, that sequence including at least one computation step and at least one measurement-based uncomputation step;
    executing the quantum circuit B on a qubit register of the quantum computer;
    recording at least one measurement result of the at least one measurement-based uncomputation step of the quantum circuit B as executed on the qubit register;
    constructing a clean-up computation graph G' based on the at least one measurement result;
    enacting reversible pebbling on the clean-up computation graph G';
    extracting a quantum circuit B' based on a sequence of steps obtained from the reversible pebbling, that sequence including computation and uncomputation steps; and
    executing the quantum circuit B' on the qubit register.

2. The method of claim 1 wherein the at least one measurement-based uncomputation step corresponds to one of a restricted subset of elementary operations of the initial computation graph G.

3. The method of claim 1 wherein extracting the quantum circuit B' comprises selecting from a plurality of pre-computed quantum circuits corresponding each to a possible measurement result of the at least one measurement-based uncomputation step.

4. The method of claim 1 further comprising receiving as input an indication of an available number of qubits of the qubit register, wherein one or more of the classical pebbling and the reversible pebbling are enacted based on the available number of qubits.

5. The method of claim 1 wherein the classical pebbling is enacted based on a cost of implementation of each of the sequence of steps obtained from the classical pebbling, and wherein the reversible pebbling is enacted based on a cost of implementation of each of the sequence of steps obtained from the reversible pebbling.

6. The method of claim 1 wherein the initial computation graph G comprises a tree structure.

7. The method of claim 1 wherein the reversible pebbling is enacted and the quantum circuit B' extracted and executed only if an estimated cost of executing the quantum circuit B' is below a threshold, the method further comprising estimating the estimated cost.

8. The method of claim 7 further comprising, if the estimated cost is above the threshold:
    enacting classical pebbling on the clean-up computation graph G';
    extracting an alternative quantum circuit based on a sequence of steps obtained from the classical pebbling of G'; and
    executing the alternative quantum circuit on the qubit register.

9. The method of claim 8 wherein execution of the alternative quantum circuit is followed by recording of at least one subsequent measurement result and constructing at least one subsequent clean-up computation graph in an iterative manner.

10. The method of claim 7 wherein the estimated cost increases with increasing size of the clean-up computation graph G'.

11. The method of claim 1 wherein the sequence of steps obtained from the classical pebbling includes at least one non-measurement-based uncomputation step.

12. Enacted in a controller system of a quantum computer, a method for executing a quantum program on the quantum computer, the method comprising:
    receiving the quantum program;
    executing a portion of the quantum program in a qubit register of the quantum computer;
    propagating a dynamic computation graph defining the executed portion of the quantum program;
    selecting an operation in the executed portion of the quantum program; and
    enacting measurement-based uncomputation on the selected operation in the qubit register.

13. The method of claim 12 further comprising employing a look-up of one or more operations in the executed portion of the quantum program, wherein the measurement-based uncomputation is enacted based on the look-up.

14. The method of claim 13 wherein the look-up comprises evaluations of one or more cost functions applied to the executed portion of the quantum program.

15. The method of claim 12, further comprising applying heuristic static pre-analysis of the quantum program prior to executing the portion of the quantum program.

16. The method of claim 12 wherein the operation is selected and the measurement-based uncomputation enacted only if fewer than a threshold number of free qubits are available in the qubit register.

17. The method of claim 16 further comprising executing at least one subsequent portion of the quantum program and propagating at least one subsequent dynamic computation graph if greater than the threshold number of free qubits are available in the qubit register.

18. The method of claim 12 wherein the operation is selected and the measurement-based uncomputation enacted only if the quantum program is not finished, the method further comprising receiving an output of the quantum program if the quantum program is finished.

19. A quantum computer comprising:
    a qubit register including a plurality of qubits;
    a modulator configured to implement one or more quantum-logic operations on the plurality of qubits;
    a demodulator configured to output data exposing a quantum state of the plurality of qubits;
    a controller operatively coupled to the modulator and to the demodulator; and computer memory holding instructions that cause the controller to:
  enact classical pebbling on an initial computation graph G defining the quantum-logic operation;
  extract a quantum circuit B based on a sequence of steps obtained from the classical pebbling, that sequence including at least one computation step and at least one measurement-based uncomputation step;
  execute the quantum circuit B on a qubit register of the quantum computer;
  record at least one measurement result of the at least one measurement-based uncomputation step of the quantum circuit B as executed on the qubit register;
  construct a clean-up computation graph G' based on the at least one measurement result;
  enact reversible pebbling on the clean-up computation graph G';
  extract a quantum circuit B' based on a sequence of steps obtained from the reversible pebbling, that sequence including computation and uncomputation steps; and
  execute the quantum circuit B' on the qubit register.

20. The quantum computer of claim 19 wherein the quantum-logic operation is a selected quantum-logic operation in a portion of a quantum program, and wherein the instructions further cause the controller to:
  execute the portion of the quantum program;
  propagate the initial computation graph, which defines the portion of the quantum program; and
  enact measurement-based uncomputation on the selected operation if a number of free qubits in a qubit register of the quantum computer is below a threshold.

* * * * *